United States Patent [19]
Gunsing

[11] Patent Number: 5,308,287
[45] Date of Patent: May 3, 1994

[54] ROTARY PUMP

[75] Inventor: Johannes T. Gunsing, Eindhoven, Netherlands

[73] Assignee: Van Doorne's Transmissie B.V., Tilburg, Netherlands

[21] Appl. No.: 910,732

[22] Filed: Jul. 8, 1992

[30] Foreign Application Priority Data

Aug. 23, 1991 [NL] Netherlands ............ 9101422

[51] Int. Cl.⁵ .................................. F16H 59/00
[52] U.S. Cl. ............................................ 474/28
[58] Field of Search .............. 474/18, 28, 69, 70; 418/133, 79, 102; 74/866-869

[56] References Cited

U.S. PATENT DOCUMENTS

| | | | |
|---|---|---|---|
| 3,645,654 | 2/1972 | Niemiec et al. | 418/133 |
| 3,718,411 | 2/1973 | Pollman | 418/82 |
| 3,752,609 | 8/1973 | Niemiec et al. | 418/133 |
| 4,376,620 | 3/1983 | Colston | 418/79 |
| 4,747,808 | 5/1988 | Moan | 474/28 |
| 4,955,260 | 9/1990 | Oshidari | 474/28 |

FOREIGN PATENT DOCUMENTS 0415089 3/1991 European Pat. Off. .

Primary Examiner—Thuy M. Bui
Attorney, Agent, or Firm—Young & Thompson

[57] ABSTRACT

The invention relates to a rotary pump for use in particular in a continuously variable transmission. The rotary pump comprises a drive shaft with a rotor, in radial grooves of which movable displacement elements are disposed and slide along the radial inner side of a surrounding cam ring, forming variable pump chambers. The rotor is bounded at both long sides by end faces, an end plate being provided with some play between at least one end face and the rotor. One or more seals are provided between the end face and the end plate, to seal the supply and/or discharge apertures of the pump in order to prevent leakages between the end plate and the end face.

12 Claims, 6 Drawing Sheets

ROTARY PUMP

FIELD OF THE INVENTION

The invention relates to a rotary pump, in particular for use in a continuously variable transmission, and provided with a rotor with drive shaft, displacement elements which are movable in grooves of the rotor, in particular rollers, a cam ring surrounding the rotor, the displacement elements sliding along the radial inner side of the cam ring and thereby surrounding pump chambers, end faces bounding the rotor at both sides, an end plate being provided between at least one of the end faces and the side face of the rotor, and one or more supply and discharge apertures.

BACKGROUND OF THE INVENTION

Such a rotary pump is known from GB-A-2,118,247 and is used in particular as a power steering pump for vehicles. In such an application the rotary pump is free from any other hydraulic system. The known rotary pump is satisfactory in such applications. The end plate is fitted with some play between an end face and the rotor. This play means that the end plate can be pressed in the optimum way against the rotor by fluid, in order in this way to eliminate leakage losses of the pump and increase the pump performance. Some leakage loss can occur between the end face and the end plate through this play.

If the known rotary pump were to be used in more complex hydraulic systems, in which several hydraulic lines are fitted close together, leakage loss of the pump or of the other hydraulic systems through the gap between the end face and the end plate would be undesirable. Thus, for layout reasons, if the rotary pump is used in a continuously variable transmission, the supply and/or discharge line of, for example, the coupling transformer or of the hydraulic cylinders of the pulleys used in it can be fitted along the rotor/drive shaft connection. The coupling transformer and/or the hydraulic cylinders could in this case gradually run dry or even be sucked dry by the pump through the gap between the end plate and the end face. This makes the transmission and the pump difficult to start up, and air can enter the system. The pressure for the coupling transformer might also not be high enough for reaching lock-up. In the case of such leakage losses a pump with a greater capacity might also be necessary.

SUMMARY OF THE INVENTION

The object of the invention is to eliminate the above-mentioned disadvantages and to provide a rotary pump which is suitable in particular for use in complex systems.

The pump mentioned in the preamble is to this end according to the invention characterized in that one or more seals are disposed between the end face and the end plate, for sealing the supply and/or discharge apertures in order to prevent leakages between the end plate and the end face.

In the rotary pump according to the invention the rotary pump is consequently hydraulically completely shut off from other hydraulic systems, and in particular from hydraulic medium at the position of the rotor/drive shaft connection.

In GB-A-2,118,247, a seal is provided at the position of the end face and the end plate, but this is a question of sealing off a pump or pressure chamber, and not sealing the supply and discharge apertures.

According to a further feature of the invention, a single seal will be sufficient if the seal is fitted between the end face and the end plate near the drive shaft of the rotor. The seal can be annular and be disposed coaxially relative to the rotor.

It is also possible to seal the supply and discharge apertures separately, which also ensures that there is no connection between the supply and discharge apertures, as a result of which the leakage loss is further reduced, and pump performance increases.

The seal can advantageously be placed on the end plate by e.g. vulcanization. According to the invention, the seal can also be disposed in a recess in the end face. According to a further feature of the invention, this recess is annular with axial longitudinal faces for radial fixing of the seal. This means that the seal is fully supported radially, and the seal is prevented from being overloaded and giving way prematurely.

The invention also relates to a continuously variable transmission provided with a rotary pump according to the invention, by means of which a very compact and efficient transmission is obtained.

BRIEF DESCRIPTION OF THE DRAWINGS

The invention will be explained with reference to a drawing and a number of embodiments. In the drawing.

DETAILED DESCRIPTION OF THE INVENTION

Figure 1:
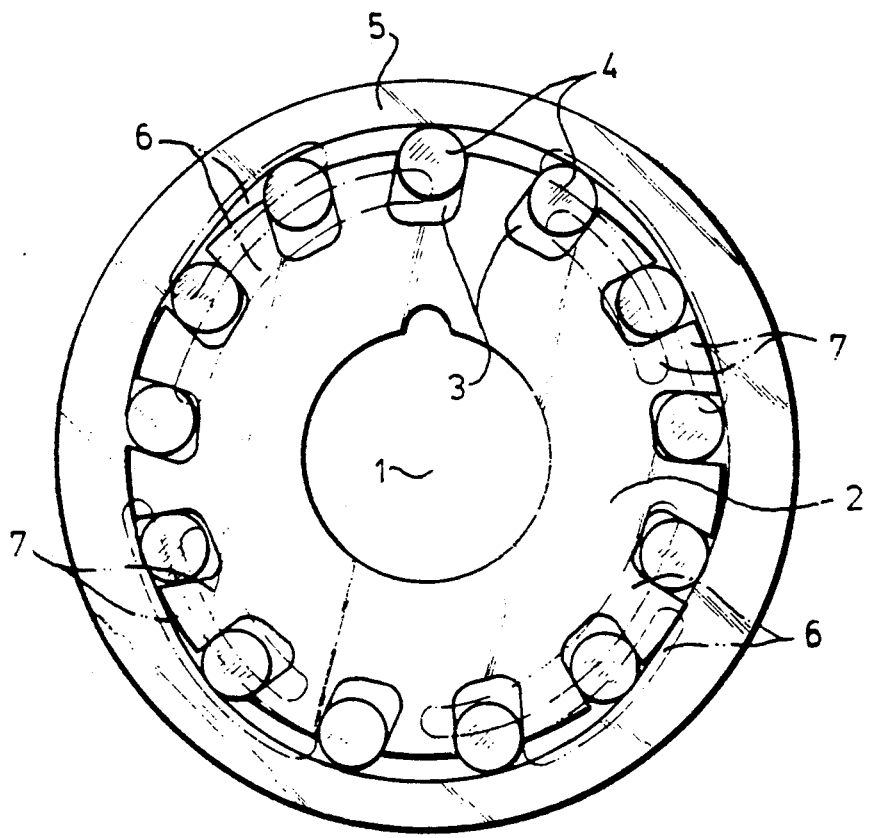
FIG. 1 is a schematic illustration of a rotary pump in cross-section.

The rotary pump according to FIG. 1 comprises a drive shaft 1, with a rotor 2 fitted on it. The rotor 2 has a number of grooves 3 in which displacement elements 4 are disposed. In the rotary pump shown the displacement elements are in the form of rollers, but other elements such as, for example, baffle plates are also conceivable. A cam ring 5 is also provided. The rotor 2, the displacement elements 4 and the cam ring 5 surround a number of pump chambers, of which the volume increases and decreases during rotation of the rotor 2. Supply and discharge of fluid takes place by means of two pairs of supply apertures 6 and two pairs of discharge apertures 7.

The rotary pump according to FIG. 1 is very suitable per se for use in continuously variable transmissions, since this pump is capable of producing high pressures at considerable output. Actual use of such a rotary pump has, however, been found impossible until now for layout reasons, because inadequate sealing relative to the other hydraulic systems in the continuously variable transmission could be obtained.

The mode of operation and design of a continuously variable transmission is assumed to be known here. Only a part of the primary pulley of the transmission 11 according to FIG. 2, with drive belt 13 clamped between it, is shown. The primary pulley comprises two sheaves 12, 14, of which the sheave 14 can slide along shaft 15. This movement is achieved by the supply and discharge of fluid between shaft 15 and shaft 17 to and from cylinder 16. Shaft 15 is placed coaxially around shaft 17, on which the rotor 18 of rotary pump 19 is fixed. Pump 19 is supplied with fluid through supply aperture 20, while fluid is discharged through a discharge aperture not shown here to a hydraulic control system, not shown here either. This hydraulic control system provides fluid which can be returned to or removed from cylinder 16 by means of line 21 and between the shafts 15, 17. The hydraulic control system also provides fluid by way of line 22 to the hollow shaft 17. It will be clear that the various hydraulic systems must be kept carefully separated. In particular, at the position of detail A in FIG. 2, there is in this case a risk, on the one hand, of fluid leaking out of the pump 19, which can thus result in a considerable performance loss, while, on the other hand, fluid could also leak out or even be sucked out of the cylinder 16 by means of the pump 19. This would make proper functioning of the transmission 11 impossible.

Figure 2:
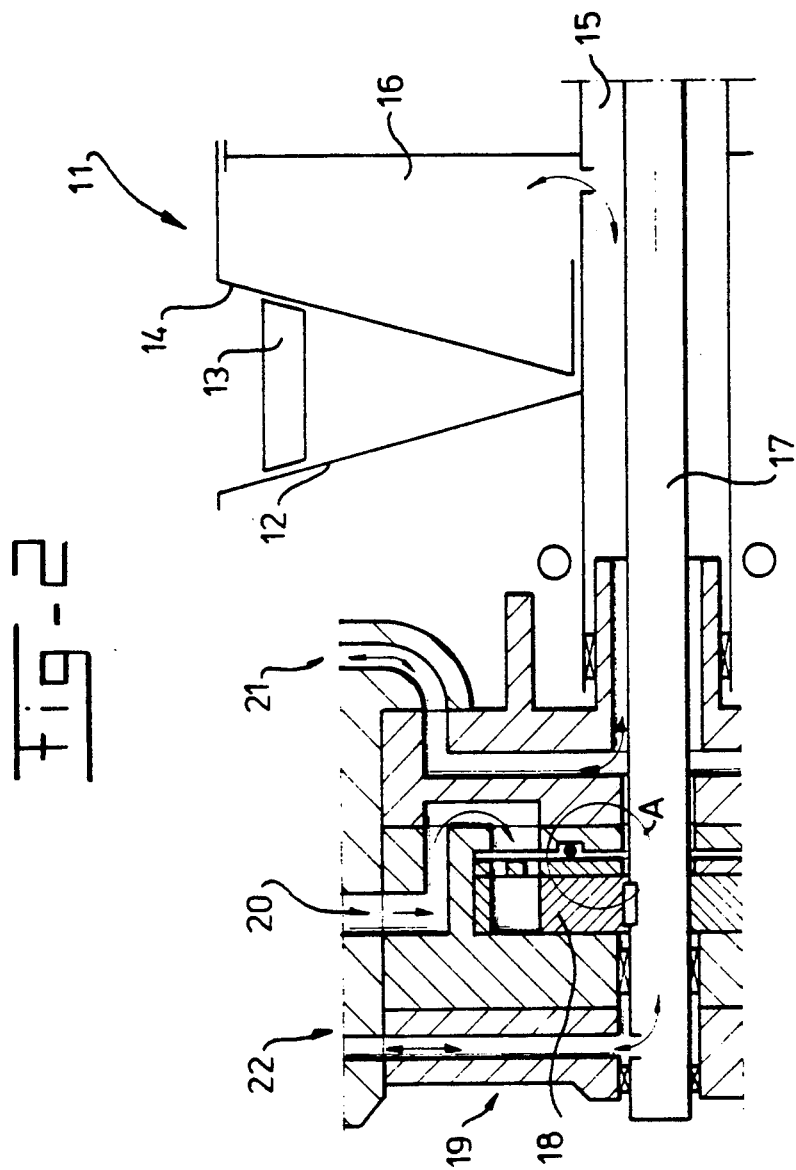
FIG. 2 shows schematically a continuously variable transmission provided with a rotary pump.
Figure 3:
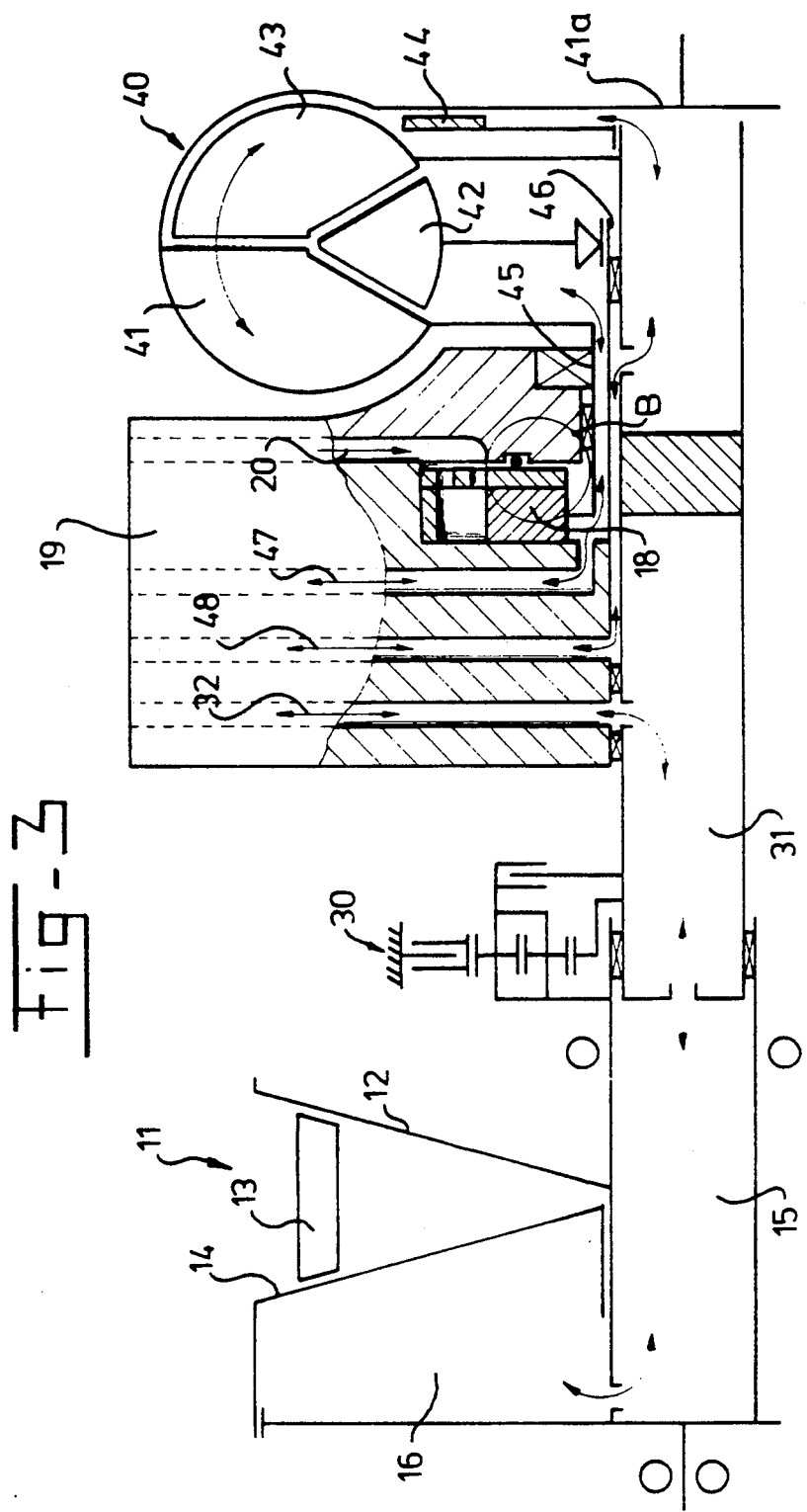
FIG. 3 shows schematically a continuously variable transmission provided with a coupling transformer as well as a rotary pump.

FIG. 3 again shows a continuously variable transmission 11 with rotary pump 19, the relevant corresponding parts being shown here with reference numbers corresponding to those in FIG. 2. The transmission is now also provided with a DNC group 30 for driving shaft 15 and shaft 31 in corresponding or opposite directions of rotation. Shaft 15 is placed partially coaxially around shaft 31. The cylinder 16 is operated by the shafts 15, 31 and line 32 by a hydraulic control system (not shown) and pump 19. A coupling transformer 40 is disposed at the side of the rotary pump 19 facing away from the continuously variable transmission 11. The coupling transformer 40, the mode of operation of which is assumed to be known, comprises a pump section 41 connected to the ingoing and driven shaft 41a, stator 42, turbine 43 and lock-up means 44. Pump section 41 is connected to drive shaft 45 of the rotor 18 of the rotary pump 19. Turbine 43 is fixed on shaft 31. The stator is fixed on fixed shaft 46. When not in the lock-up position, the coupling transformer 40 is supplied by pump 19 by way of a hydraulic control system (not shown), line 48, between the coaxially placed shafts 31 and 46, and then by shaft 31. In the lock-up position, the coupling transformer is also supplied by the pump 19 and a hydraulic control system (not shown) by way of line 47 between the coaxially placed shafts 46 and 45. It will be clear that in this complex layout the sealing of the different hydraulic systems is even more difficult to achieve. In particular at the position of detail B in FIG. 3, there is a risk of fluid leaking out or being sucked out of coupling transformer 40 by pump 19. Starting up the transmission can be rendered difficult or impossible by this. In particular, fluid intended for the lock-up means 44 can also leak out, with the result that the coupling transformer 40 cannot possibly go into lock-up. The designs of a continuously variable transmission provided with a rotary pump according to the invention shown in FIGS. 2 and 3 are also very advantageous and permit a very compact construction of the transmission.

Figure 4:
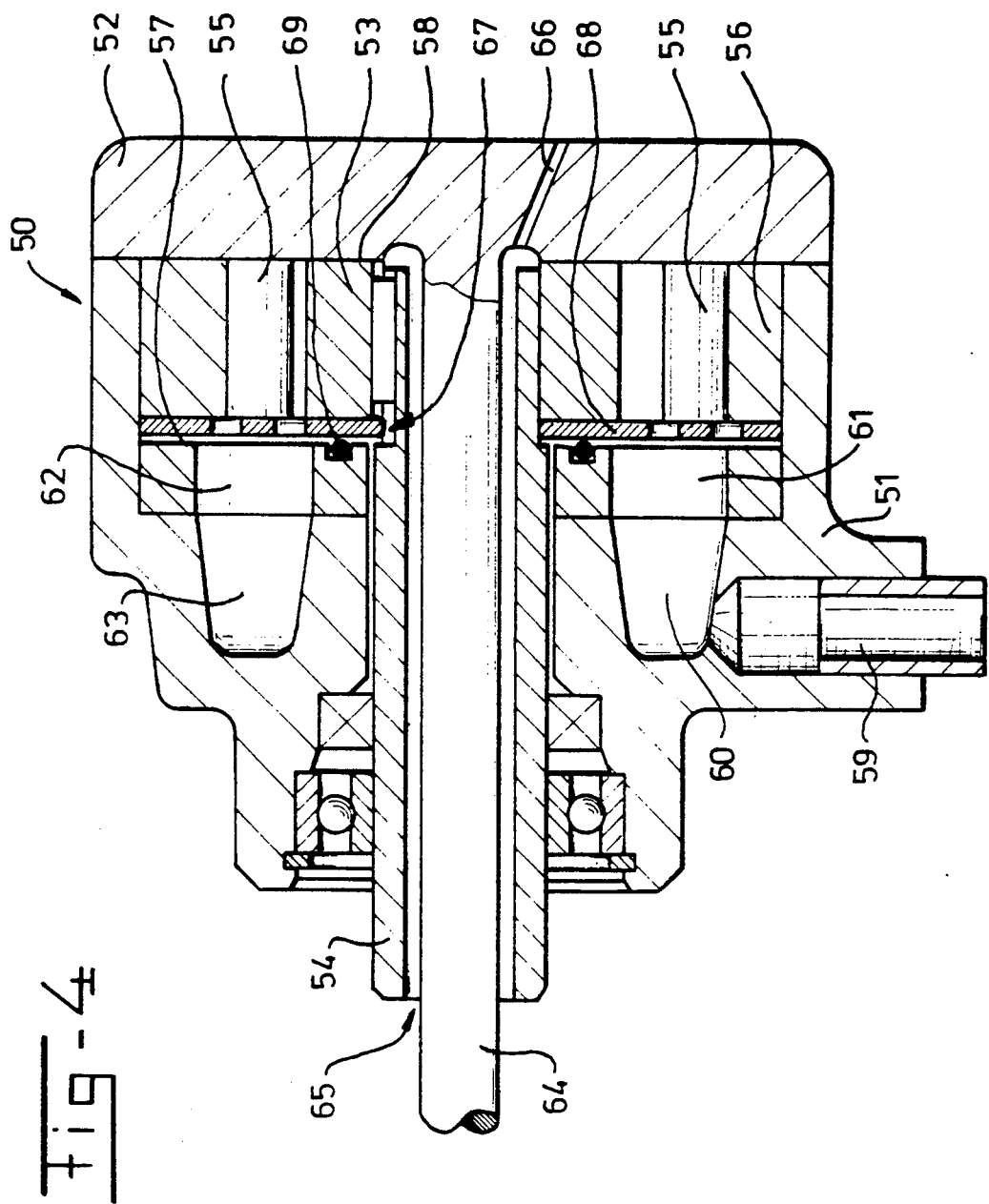
FIG. 4 shows in cross-section a first embodiment of the rotary pump according to the invention.

The pump 50 shown in a first embodiment in FIG. 4 comprises a housing 51, 52, a rotor 53 disposed on drive shaft 54, displacement elements 55, and a cam ring 56. The rotor 53 is enclosed on both sides between end faces 57, 58. An end plate 68 is also fitted, in order to obtain a good connection with the rotor, with a view to preventing leakage losses. End plate 68 is in this case made floating with some play, so that the hydraulic excess pressure at the side facing away from the rotor presses the end plate 68 against the rotor. The pump 50 is also provided with an aperture 59, which enables the pump 50 to suck in fluid through passage 60 and supply aperture 61. Apertures (not shown) are also present to permit the discharge of fluid under pressure through passage 63 and discharge aperture 62. The drive shaft 54 of rotor 53 is placed coaxially around a shaft 64. Between the drive shaft 54 and the shaft 64 is a passage 65 for fluid, which is connected to a passage 66 in housing 52. The passages 65, 66, with reference to FIGS. 2 and 3 respectively, can be used for fluid supply and discharge to and from, for example, the hydraulic cylinder of the continuously variable transmission or of a coupling transformer. As can be seen in FIG. 4, it would be possible in principle for fluid from the different hydraulic systems to come into contact with each other at the position of reference number 67, with all the disadvantages described above which this would entail. This problem is caused in particular through the fact that the end plate 68 must be fitted with some play between end face 57 and the rotor 53, in order to ensure good functioning. However, according to the invention, a seal 69 can advantageously be fitted. By means of this seal 69 the end plate 68 retains sufficient play, through elastic compression of the seal, so that good functioning is ensured. On the other hand, an effective seal to prevent leakage between the different hydraulic systems has been provided. The seal 69 according to FIG. 4 is disposed near the drive shaft 54 of rotor 53, coaxially therewith.

Figure 5:
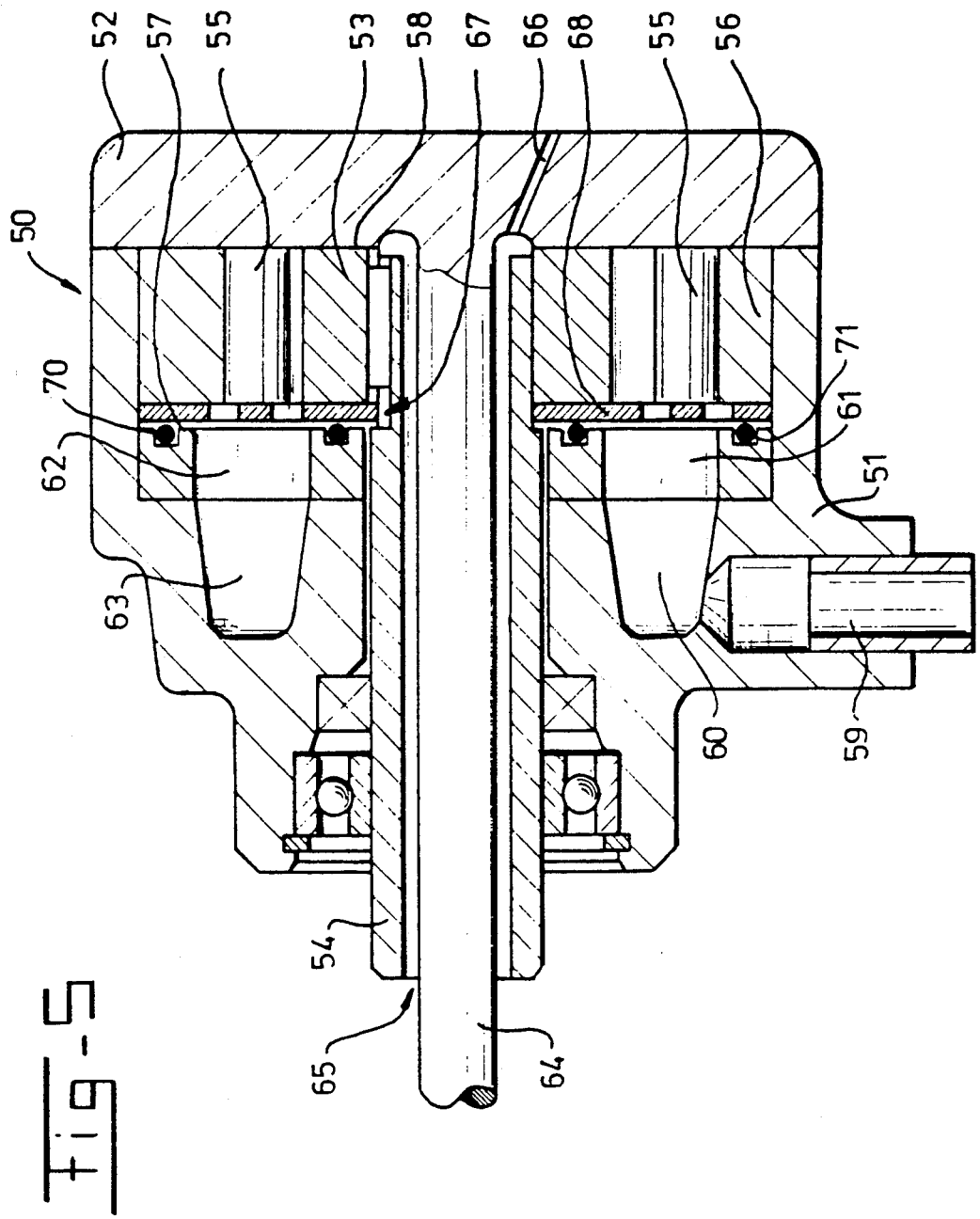
FIG. 5 shows in cross-section a second embodiment of the rotary pump according the invention.

FIG. 5 shows a second embodiment of the invention, and the parts of pump 50 with parts corresponding to those of FIG. 4 are indicated by corresponding reference numbers. In FIG. 5 several seals are fitted, around all supply and discharge apertures 61, 62 of the pump. A disadvantage compared with the embodiment shown in FIG. 5 is that several seals 70, 71 must be fitted, but on the other hand this has the advantage that a better seal between the supply apertures 61 and discharge apertures 62 is also obtained in the pump itself, which reduces the internal loss of the pump 50.

Figure 6A:
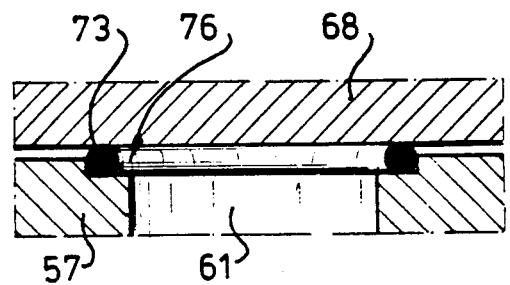
FIGS. 6a, 6b, 6c show some detail embodiments of the seal according to the invention.
Figure 6B:
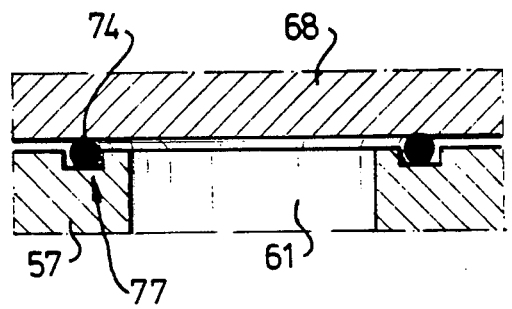
Figure 6C:
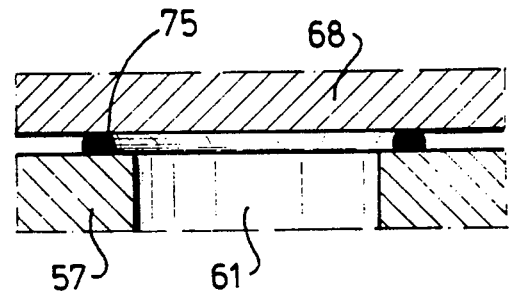

FIG. 6a shows a possible embodiment of the sealing, in which the seal 73 is fitted in a groove 76 of end face 57, in this case around supply aperture 61. The seal 73 seals end face 57 against end plate 68. Although this embodiment will be very suitable in many cases, there is a risk of the seal 73 being pressed inwards where there is a slightly larger load. The seal will consequently no longer be satisfactory. For that reason, the embodiment according to FIG. 6b is very advantageous, in this case a seal 74 being placed in an annular groove 77. Since said annular groove 77 has axially raised longitudinal faces both on the radial inner side and outer side, the risk of seal 74 being pressed out of the groove and at least partially losing its effect is eliminated. It will be clear that the invention is not limited to the embodiments shown in the figures, but that many other embodiments which are considered to fall within the scope of the invention are conceivable within the scope of the invention. Thus, FIG. 6c shows that the seal 75 can also be fixed on the end plate 68, for example through vulcanization.

I claim:

1. Continuously variable transmission comprising a driving belt/pulley arrangement whose pulley has two sheaves, at least one of which is axially displaceable relative to a pulley shaft by means of a hydraulic cylinder, and a rotary pump with a drive shaft, said rotary pump having a rotor with displacement elements which are movable in grooves of the rotor, a cam ring surrounding the rotor, said displacement elements sliding along the radial inner side of the cam ring and thereby surrounding pump chambers, end faces bounding the rotor at both sides, and one or more supply and discharge apertures, and end plate being provided between at least one of said end faces and a side face of the rotor, and at least one seal disposed between the end face and the end plate, for sealing the supply and/or discharge apertures in order to prevent leakages between the end plate and the end face.

2. Continuously variable transmission according to claim 1, wherein the drive shaft of the rotor of the rotary pump is disposed at least partially coaxially in the pulley shaft.

3. Continuously variable transmission according to claim 2, wherein the hydraulic cylinder is supplied through a passage between the drive shaft and the pulley shaft.

4. Continuously variable transmission according to claim 1, wherein said at least one seal is fixed on the end plate.

5. Continuously variable transmission according to claim 4, wherein the seal is vulcanized on the end plate.

6. Continuously variable transmission comprising a driving belt/pulley arrangement whose pulley has two sheaves, at least one of which is axially displaceable relative to a pulley shaft by means of a hydraulic cylinder, a torque converter including a stator fixed on a fixed shaft, a turbine, and a turbine shaft connected to the pulley shaft, a rotary pump with a drive shaft, whereby a pump section of the torque converter is coupled to the drive shaft of the rotary pump, said drive shaft being disposed coaxially around the fixed shaft of the stator, said rotary pump having a rotor with displacement elements which are movable in grooves of the rotor, a cam ring surrounding the rotor, said displacement elements sliding along the radial inner side of the cam ring and thereby surrounding the pump chambers, end faces bounding the rotor at both sides, and one or more supply and discharge apertures, and end plate being provided between at least one of said end faces and a side face of the rotor, and at least one seal disposed between the end face and the end plate, for sealing the supply and/or discharge apertures in order to prevent leakages between the end plate and the end face.

7. Continuously variable transmission according to claim 6, wherein the torque converter in a lock-up position is supplied through a passage between the fixed shaft of the stator and the drive shaft of the rotor of the rotary pump.

8. Continuously variable transmission according to claim 6, wherein the fixed shaft of the stator is disposed at least partially coaxially around the turbine shaft of the torque converter, and the torque converter when not in a lock-up position is supplied through a passage between the fixed shaft of the stator and the turbine shaft.

9. Continuously variable transmission according to claim 6, wherein said at least one seal between the end face and the end plate is near the drive shaft of the rotor.

10. Continuously variable transmission according to claim 9, wherein the seal is annular and is disposed coaxially relative to the drive shaft of the rotor.

11. Continuously variable transmission according to claim 6, wherein said at least one seal is fixed on the end plate.

12. Continuously variable transmission according to claim 11, wherein the seal is vulcanized on the end plate.

* * * * *